United States Patent [19]

Orlans

[11] Patent Number: 4,692,247

[45] Date of Patent: Sep. 8, 1987

[54] FLUID FILTERING DEVICE

[75] Inventor: Itzhak Orlans, Hevel Korazim, Israel

[73] Assignee: Amiad Sinun Vehashkaya, M.P. Hevel Korazim, Israel

[21] Appl. No.: 828,557

[22] Filed: Feb. 10, 1986

[30] Foreign Application Priority Data

Mar. 7, 1985 [IL] Israel .................................... 74527

[51] Int. Cl.⁴ ........................................... B01D 25/02
[52] U.S. Cl. .................................... 210/314; 210/488
[58] Field of Search ..................... 210/322, 332, 333.1, 210/333.01, 340, 314, 341, 343, 345, 339, 407, 409, 411, 412, 488, 489; 55/482, 485, 486

[56] References Cited

U.S. PATENT DOCUMENTS 3,397,794  8/1968  Toth et al. ......................... 210/488

Primary Examiner—Frank Sever
Attorney, Agent, or Firm—Browdy and Neimark

[57] ABSTRACT

An annular filter disc for use in a fluid filtering device and being of crenellated shape having outwardly directed bay portions alternating with inwardly directed projecting portions, the latter having edges substantially located on a circular envelope substantially concentric with the disc.

3 Claims, 4 Drawing Figures

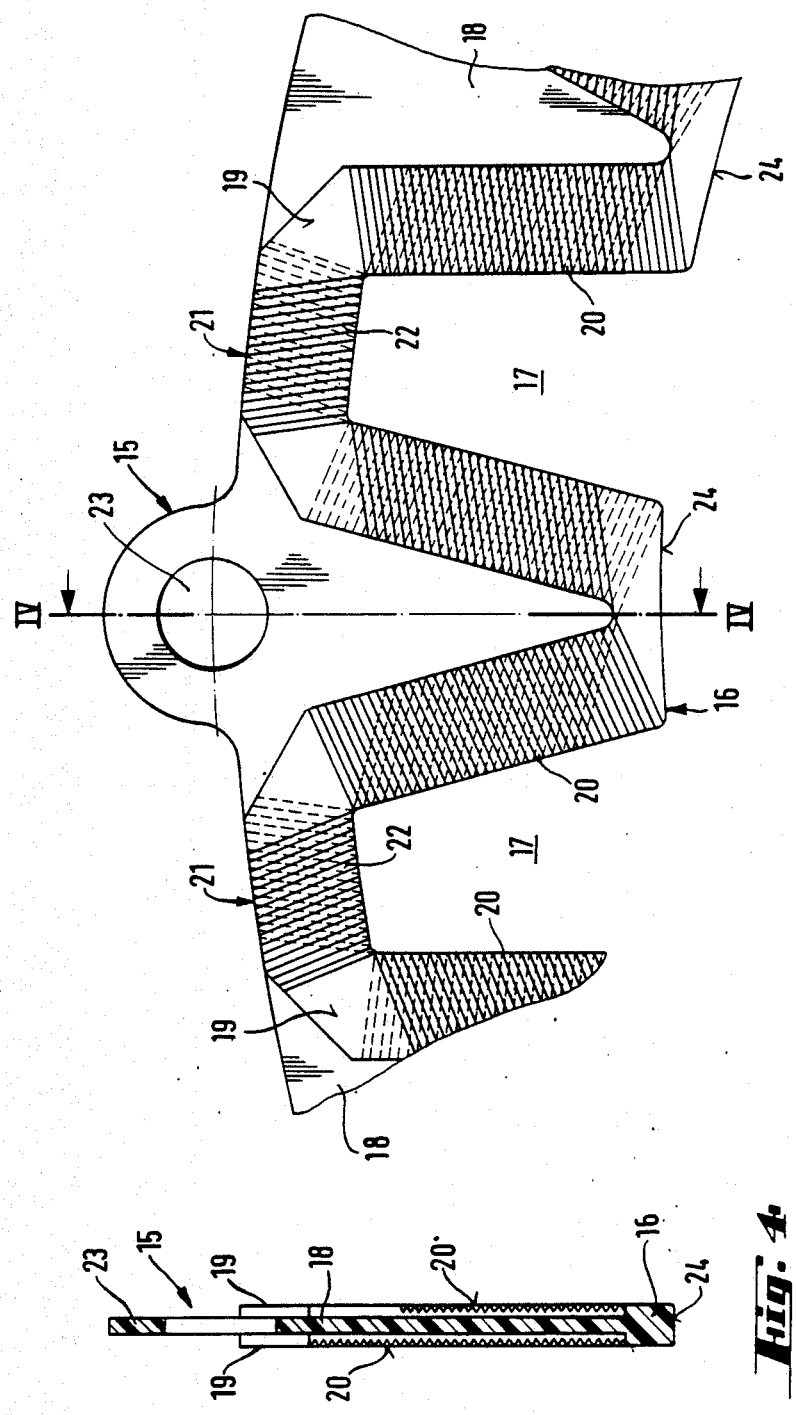

FLUID FILTERING DEVICE

The present invention relates to a fluid filtering device comprising a housing with inlet and outlet ports through which, fluid to be filtered flows into and out of the housing. A cylindrical filter is located within the housing with an inner surface thereof in flow communication with the inlet port and with an outer surface thereof in flow communication with the outlet port so that all flow of the fluid, through the housing, passes through the filter.

The present invention is particularly concerned with such a fluid filtering device wherein the cylindrical filter is constituted by a stack of annular filter discs which are suitably mounted and held together so as to form a tubular cylindrical element, one or both of the adjacent contacting faces of each pair of juxtaposed discs being formed with grooves, indentations or the like such that fluid passes through the stacked filter discs via the grooves or the like, in which grooves or the like any contaminants are trapped. Such annular filter discs will hereinafter be referred to as "an annular filter disc of the kind specified" whilst a cylindrical filter constituted by a stack of annular filter discs of the kind specified will hereinafter be referred to as "cylindrical filter of the kind specified".

With such fluid filtering devices means are generally provided for periodically cleaning the cylindrical filter, such means involving the creation of a reverse fluid flow through the filter so as to flush away entrained contaminants. Preferably the cleaning means is arranged to traverse periodically the entire inner surface of the cylindrical filter with the reverse flow, at any particular instant, being confined to a small area thereof and in this way the cleaning efficiency is increased whilst interference with the overall filtering function is reduced to a minimum. Fluid filtering devices with such cleaning means have long been known. Such a known device is shown, for example, in U.S. Pat. specification Ser. No. 828,556.

With such fluid filter devices the efficiency of the device in effecting filtration is dependent, inter alia, on the inner surface area of the filter exposed to the fluid throughflow. With a conventional cylindrical filter of the kind specified, this area is essentially the area of the inner cylindrical surface of the filter. Furthermore, and with fluid filter devices having reverse flow cleaning means, the efficiency of the cleaning is largely dependent on the degree to which the reverse flow can in fact be confined to the small area of the filter at any one time.

It is an object of the present invention to provide an annular filter disc of the kind specified for use in forming a cylindrical filter of the kind specified, in which the inner surface area of the filter thus formed is substantially increased and in which cleansing efficiency is substantially improved.

According to the present invention there is provided an annular filter disc of the kind specified of crenellated shape having outwardly directed bay portions alternating with inwardly directed projecting portions, the latter having edges substantially located on a circular envelope substantially concentric with the disc.

With a cylindrical filter of the kind specified and constituted by a stack of such annular filter discs in accordance with the present invention, the inner surface area of the cylindrical filter thus formed is very substantially increased as compared with that of filters formed of conventional filter discs. In addition however the crenellated shape of the discs, creating as they do bay portions, facilitates the concentration of the reverse flow cleansing action with a consequently increased efficiency of cleansing accompanied by a minimal interference with the normal filtration action.

For a better understanding of the present invention and to show how the same may be carried out in practice, reference will now be made to the accompanying drawings in which:

FIG. 3 is a view on an enlarged scale of a detail of the filter disc shown in FIG. 2; and FIG. 4 is a cross-sectional view of the disc shown in FIG. 3 taken along the line IV—IV.

Figure 1:
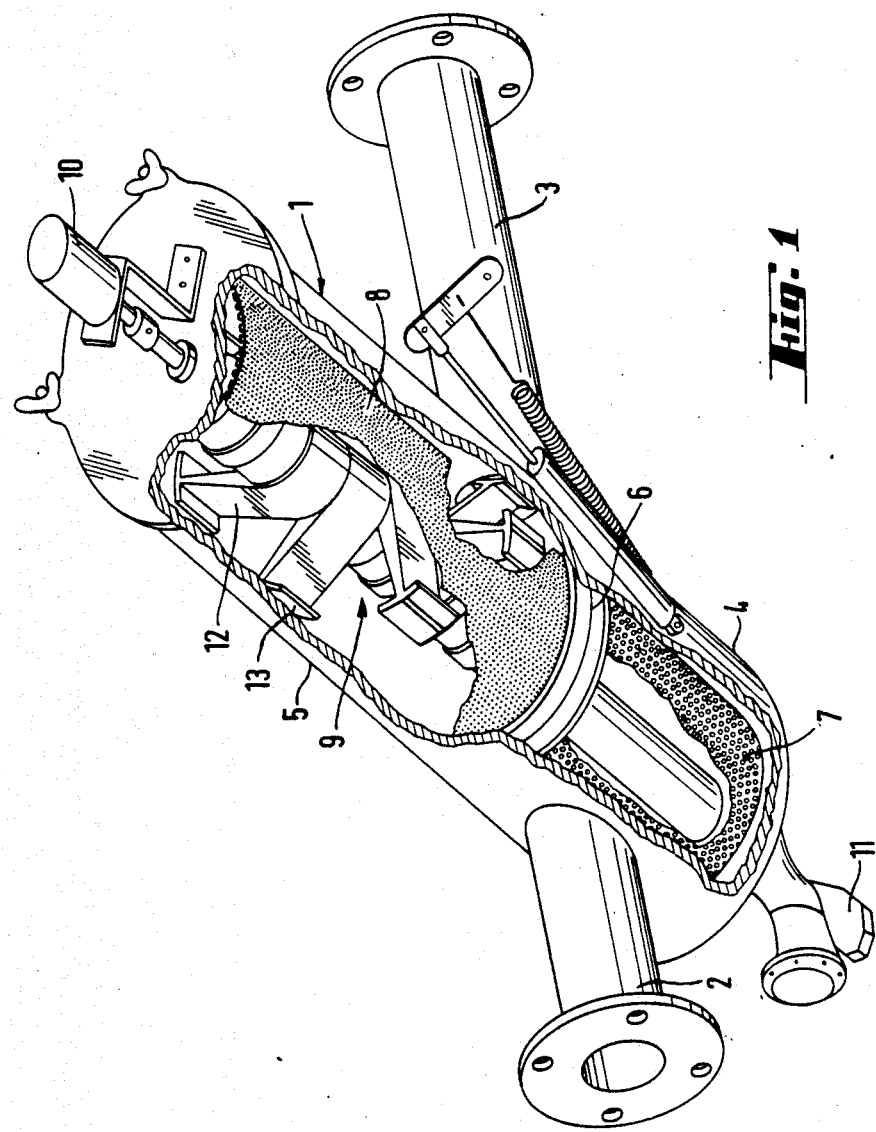
FIG. 1 is a partially cut away perspective view of a fluid filtering device incorporating a stack of annular filter discs in accordance with the invention.

The fluid filtering device shown in FIG. 1 comprises a housing 1 having an inlet port 2 and an outlet port 3. As can be seen, the inlet port 2 communicates with a lower portion 4 of the housing 1 whilst the outlet port 3 communicates with an upper portion 5 of the housing 1 which portions 4 and 5 are separated by an annular disc 6. Located in the lower portion 4 of the housing 1 is a coarse filter 7 whilst located in the upper portion 5 of the housing 1 is a fine cylindrical filter 8 formed of a stack of annular filter discs in accordance with the invention. The relative disposition of the device components is such that fluid entering the housing 1 through the inlet port 2 passes through the coarse filter 7 and via a central aperture in the separating disc 6 into the interior of the upper portion 5 defined by the inner side of the cylindrical filter 8 and from there passes through the cylindrical filter 8 so as to emerge from the device via the outlet port 3. Extending through the housing is a central discharge conduit 9 which is coaxial with the cylindrical filter 8 and which is rotatably displaceable by means of a suitable drive mechanism 10 and which is adapted to communicate with the atmosphere via a valve mechanism 11. The portion of the discharge conduit 9 located in the upper portion 5 of the housing 1 is provided with a plurality of successive inlet limbs 12, each tangentially disposed with respect to the discharge conduit 9 and each having a flanged mouth 13 juxtaposed with respect to the inner surface of the tubular filter 8.

The filter 8 is cleaned by arranging for the discharge conduit 9 to be vented to the atmosphere via the valve mechanism 11 and to be intermittently rotated so that a flushing fluid flow takes place through the filter 8 and the inlet limbs 12 and out of the discharge conduit 9.

Figure 2:
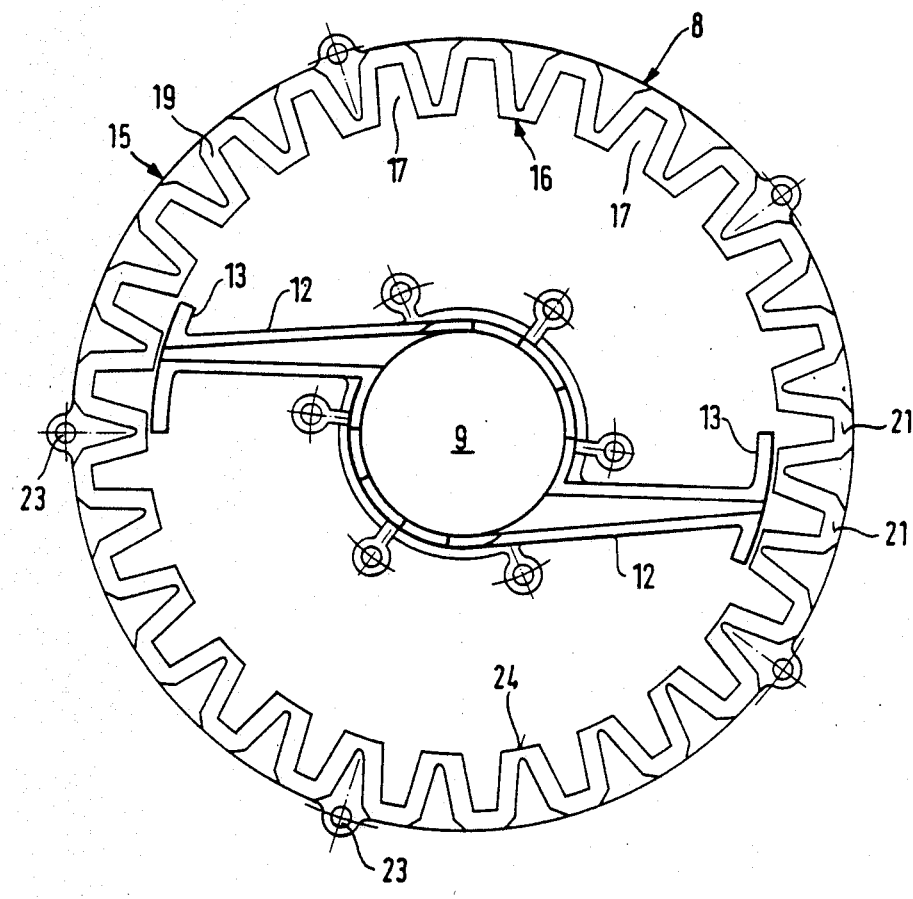
FIG. 2 is a plan view from above of an uppermost annular filter disc in accordance with the invention forming part of the stack of the device shown in FIG. 1.

As seen in FIG. 2 of the drawings, the cylindrical filter 8 itself is constituted of a plurality of stacked annular filter discs 15 of which only the uppermost is shown in the drawings. Each disc 15 is of crenellated shape and comprises successive inwardly directed projecting portions 16 each such portion defining between them an inwardly directed bay 17.

As can be seen from FIGS. 3 and 4 of the drawings, the disc 15 is formed of a central layer 18 having formed integrally on either side thereof substantially sinusoidal layers 19 on which are formed criss-crossing grooves 20. Thus, as can be seen, each inwardly projecting portion 16 is formed, on either side thereof with a substantially V-shaped grooved layer and with a central web portion. Each portion 16 is coupled to the succeeding portion 16 by a bridge portion 21 which is also provided on either side thereof with a grooved layer 22. Formed integrally with web portions at radially spaced apart locations are apertured coupling lugs 23 through which pass mounting rods (not shown) serving to mount the stacked discs 15 in position.

As can be seen, each projecting portion 16 is formed with an innermost edge 24, the edges 24 of all the portions 16 lying on a substantially circular envelope concentric with the disc 15 itself.

In use, and with the stacked discs 15 forming a cylindrical filter 8 and with the filter cleaning device constructed and operating in a known fashion, the crenellated filter surface is clearly of a relatively substantial surface area and this increased area renders the filter as a whole more efficient in its filtering action. Additionally however, in view of the fact that the stacked discs 15 present bays 17 to the flanged mouths 13 of the inlet limbs 12 then, and as can be seen from FIG. 2 of the drawings, each bay 17 is successively subjected to the entire reverse cleansing flow and thus all the contaminants which may have become trapped or entrained in that bay are effectively dislodged and removed.

It will therefore be readily appreciated that the crenellated shape of the discs is instrumental in allowing for the construction of a highly efficient filter with increased efficiency of cleaning.

I claim:

1. A fluid filtering device comprising a housing with inlet and outlet ports through which fluid to be filtered flows into and out of the housing;
   a tubular filter located in the housing with an inner side thereof in flow communication with the inlet port and an outer side thereof in flow communication with the outlet port so that all flow of said fluid through the housing passes through the filter; a tubular, contaminant discharge conduit centrally disposed in the filter and substantially coaxial therewith;
   one or more transversely directed, tubular inlet limbs of said discharge conduit, each limb extending from the discharge conduit to a free mouthlike opening juxtaposed with respect to the inner side of the filter so as to provide a flowpath therefrom to the discharge conduit, each inlet limb terminating in a pair of flanges which extend outwardly with respect to the inlet limb mouthlike opening so as to present a flowing surface juxtaposed with respect to the inner filter surface;
   said tubular filter being formed of a plurality of stacked annular filter discs, each disc being of crenellated shape having outwardly directed bay portions alternating with inwardly directed projecting portions which have edges substantially located on a circular envelope substantially concentric with the disc, the stacked edges forming successive component cylindrical surfaces, the arrangement being such that rotational displacement of the discharge conduit together with at least one discharge limb results in the mouthlike opening of each discharge limb sweeping by a preselected section of the inner side of the tubular filter with the limb flanges bridging successive component cylindrical surfaces.

2. A fluid filtering device according to claim 1 wherein each projecting portion of each annular filter disc has formed on either side thereof a pair of grooved layers, successive projecting portions being coupled together by means of grooved bridge portions.

3. A filter comprising: means for enabling use in a fluid filtering device including a housing with inlet and outlet ports through which fluid to be filtered flows in and out of the housing, including,
   a tubular filter for location within the housing with an inner side thereof in flow communication with the inlet port of the housing and an outer side thereof in flow communication with the outlet port of the housing so that all flow of said fluid through the housing passes through said filter;
   a tubular, contaminant discharge conduit centrally disposed in the filter and substantially coaxial therewith;
   one or more transversely directed, tubular inlet limbs of said discharge conduit, each limb extending from the discharge conduit to a free mouthlike opening juxtaposed with respect to the inner side of the filter so as to provide a flowpath therefrom to the discharge conduit, each inlet limb terminating in a pair of flanges which extend outwardly with respect to the inlet limb mouthlike opening so as to present a flowing surface juxtaposed with respect to the inner filter surface;
   said tubular filter being formed of a plurality of stacked annular filter discs, each disc being of crenellated shape having outwardly directed bay portions alternating with inwardly directed projecting portions which have edges substantially located on a circular envelope substantially concentric with the disc, the stacked edges forming successive component cylindrical surfaces, the arrangement being such that rotational displacement of the discharge conduit together with at least one discharge limb results in the mouthlike opening of each discharge limb sweeping by a preselected section of the inner side of the tubular filter with the limb flanges bridging successive component cylindrical surfaces.

* * * * *